United States Patent Office 3,458,690
Patented July 29, 1969

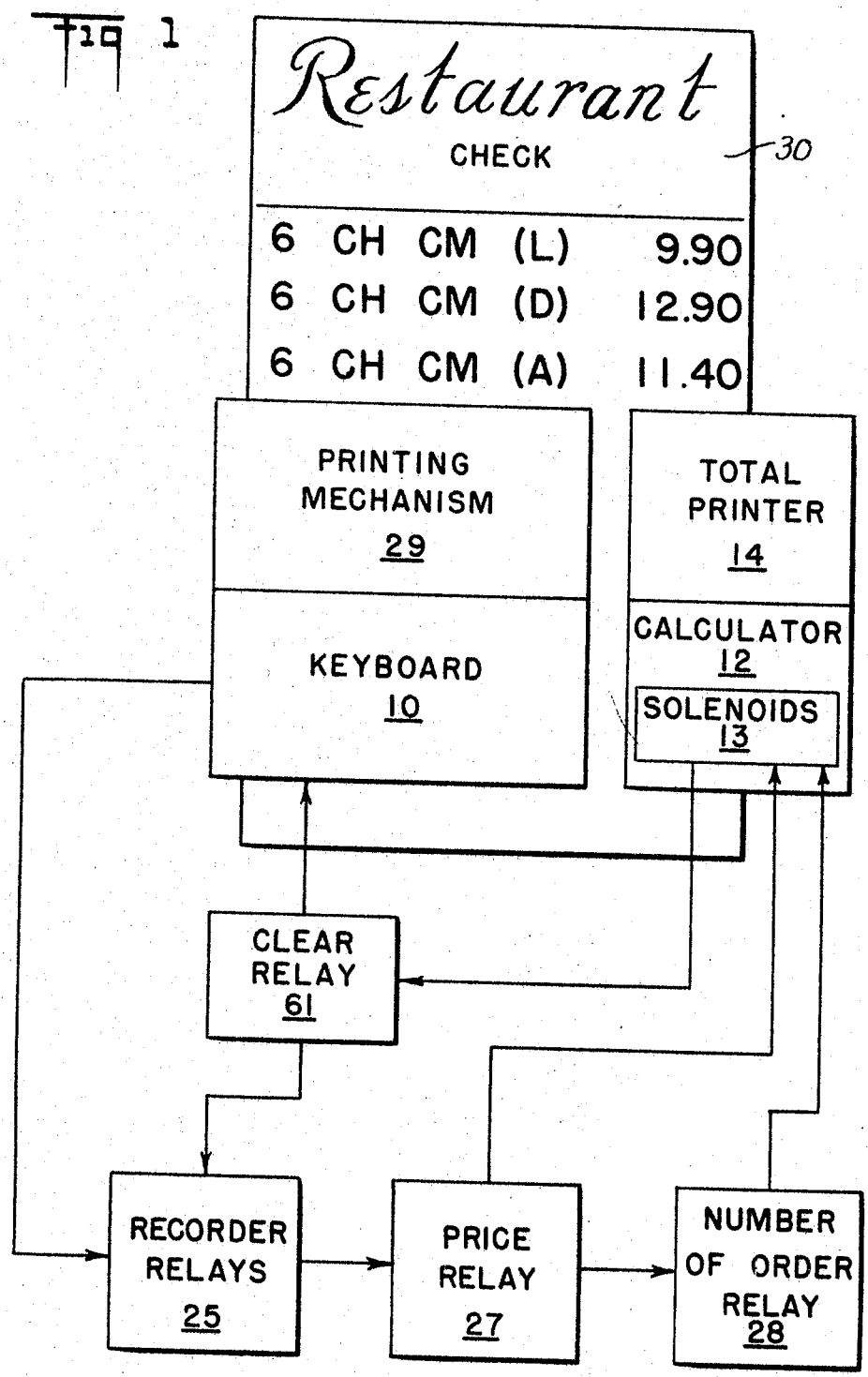

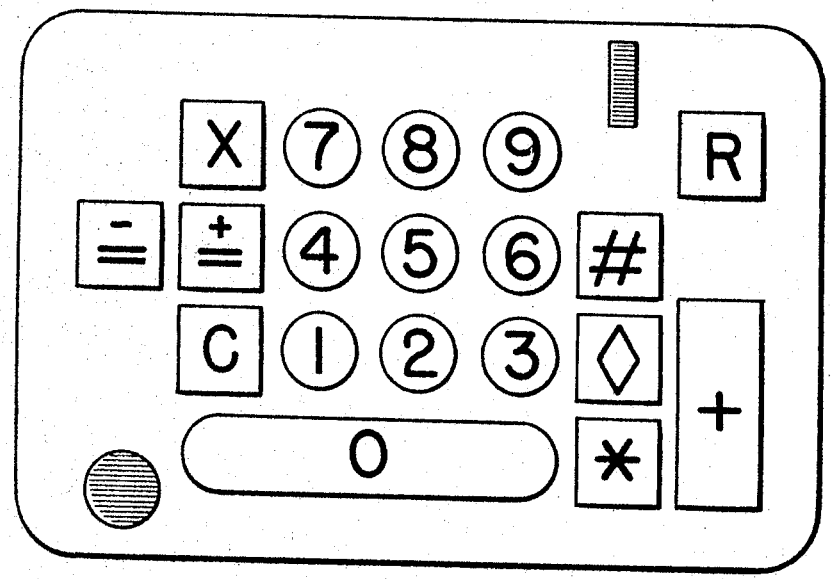

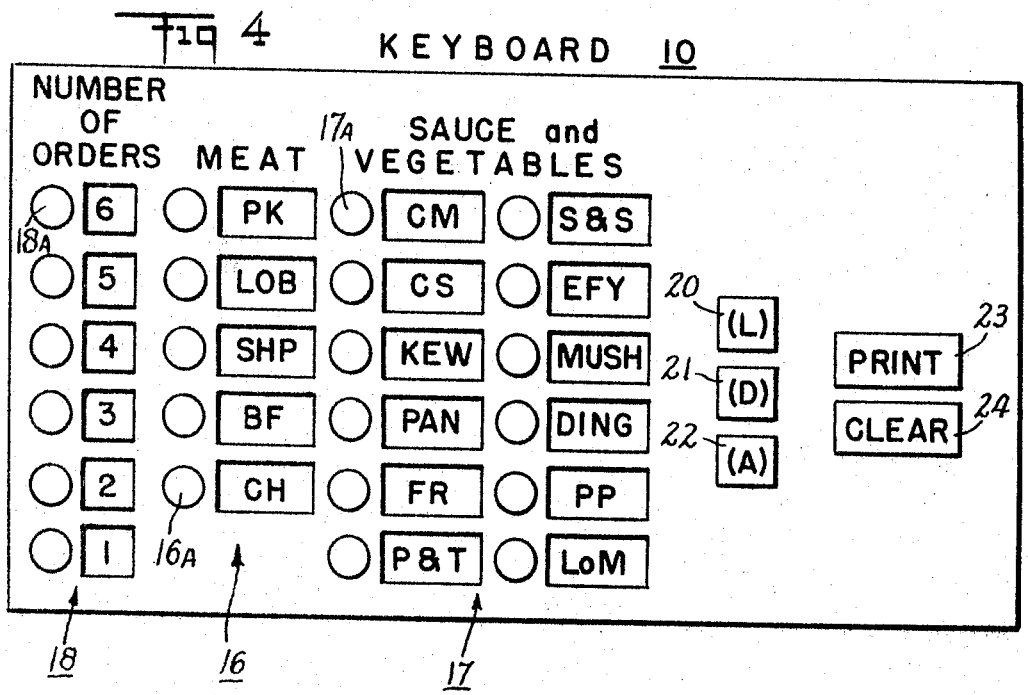
— LEGEND —
PK — PORK
LOB — LOBSTER
SHP — SHRIMP
BF — BEEF
CH — CHICKEN
CM — CHOW MEIN
CS — CHOP SUEY
FR — FRIED RICE
P&T — PEPPER and TOMATO
S&S — SWEET and SOUR
EFY — EGG FOO YOUNG
MUSH — MUSHROOMS
PP — PEA PODS
LoM — Lo MEIN
L — LUNCHEON
D — DINNER
A — A la CARTE

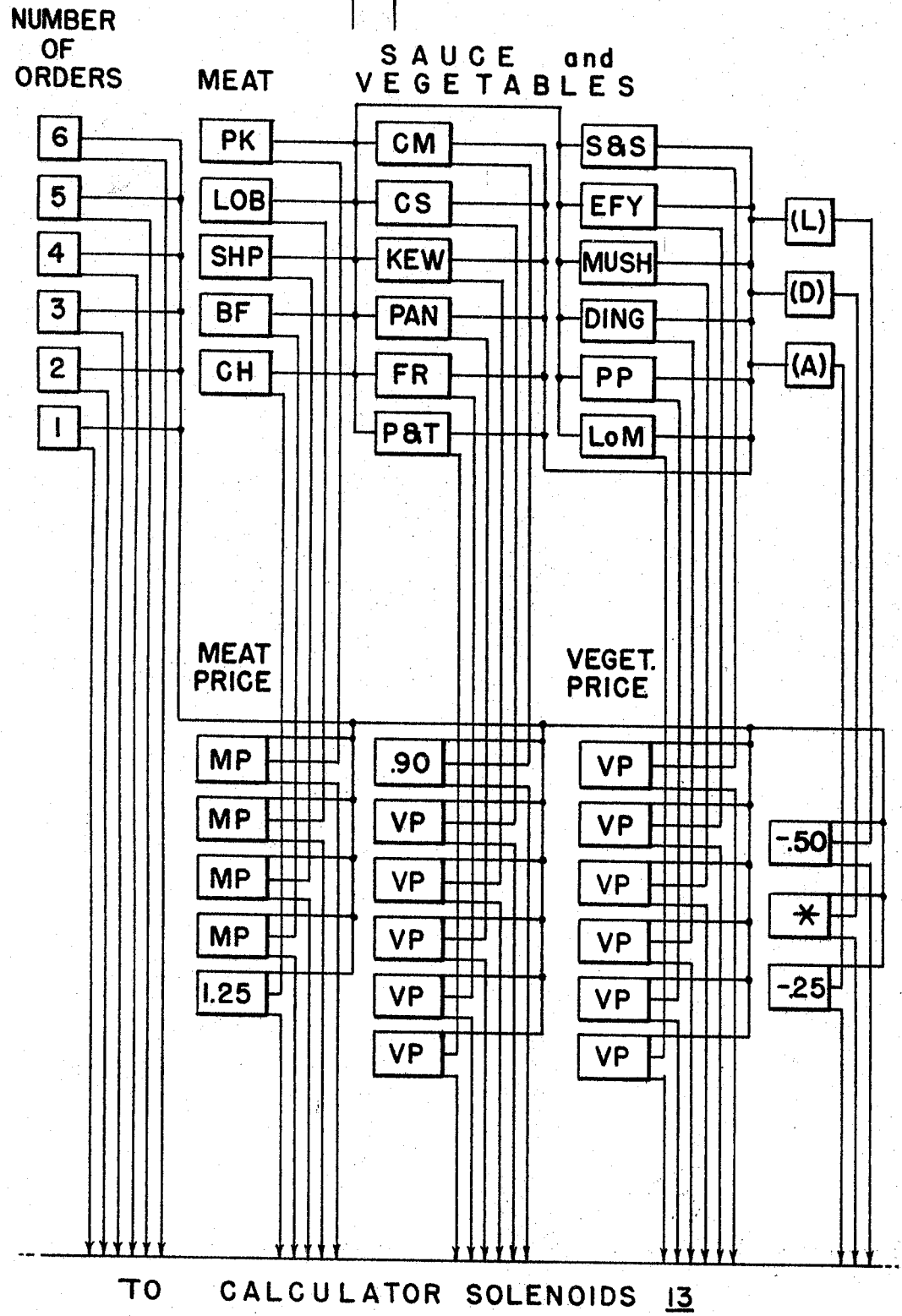

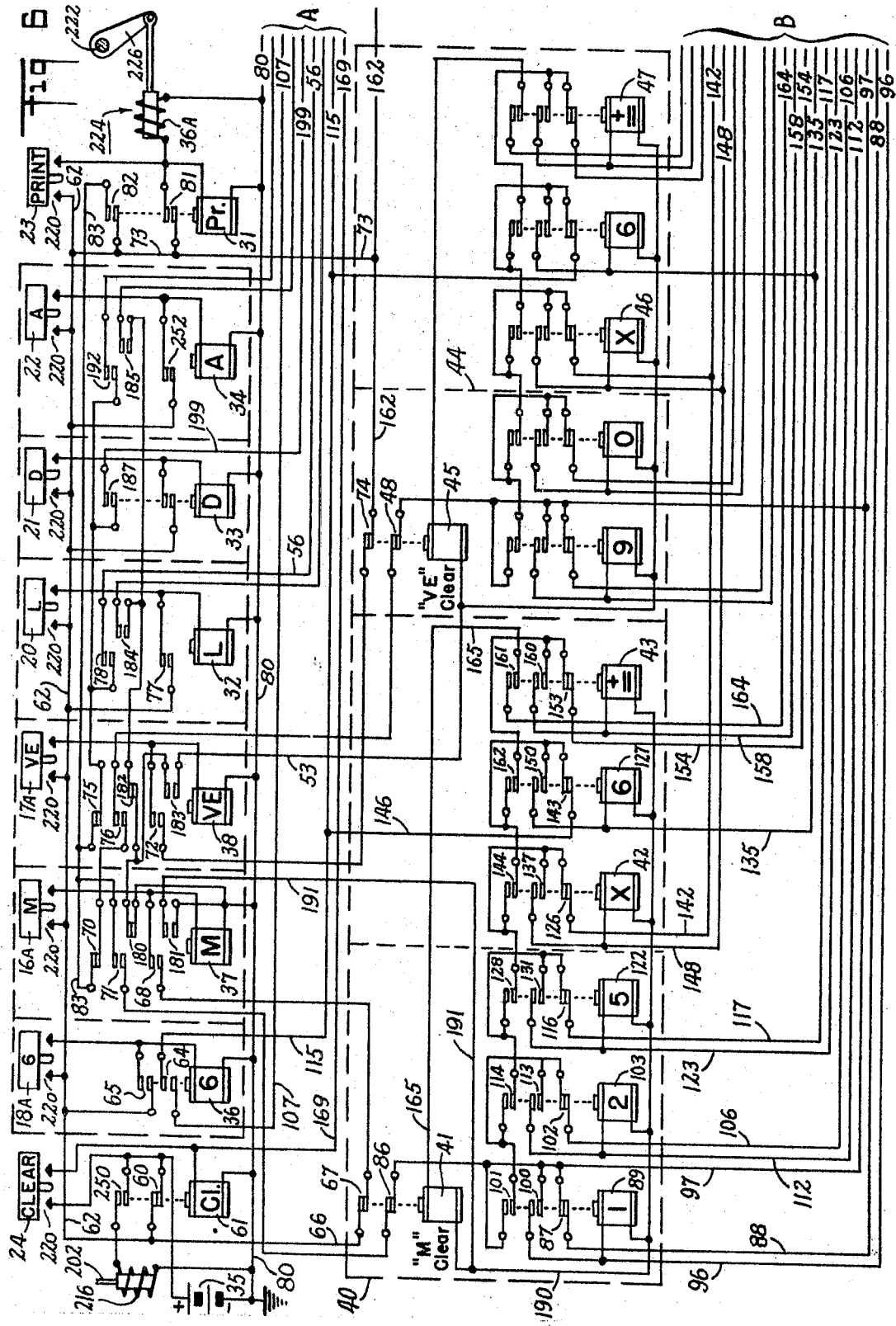

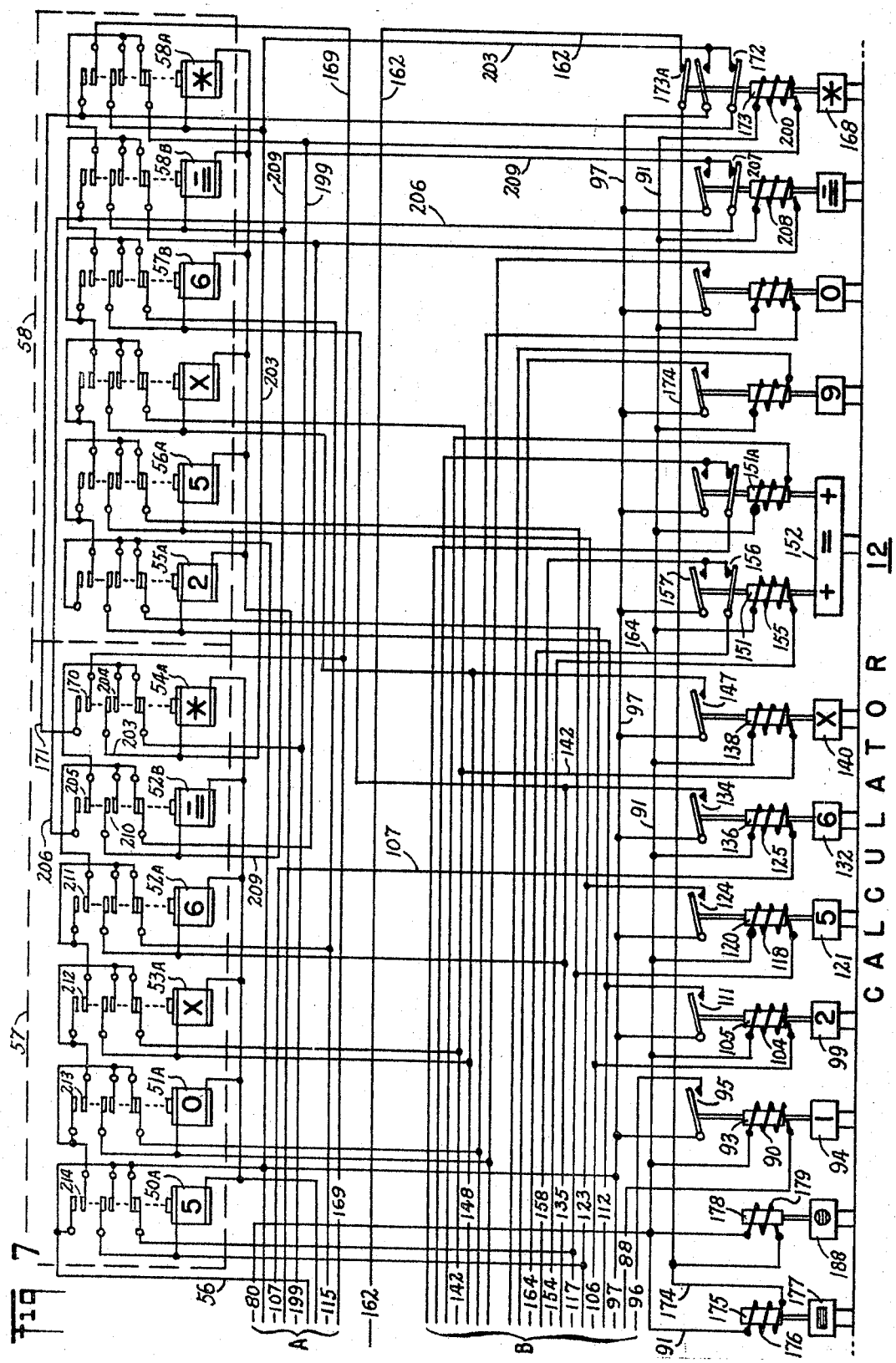

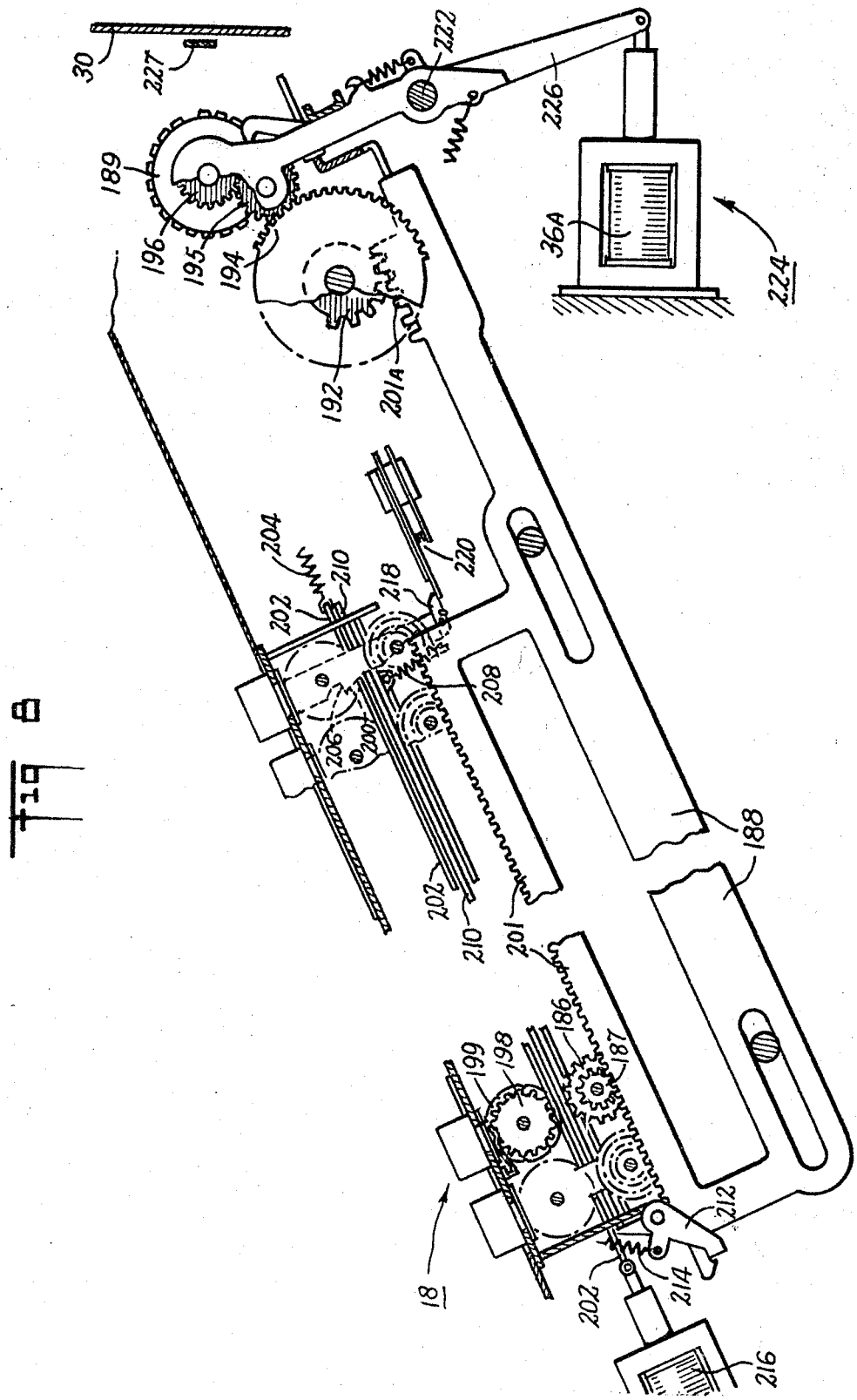

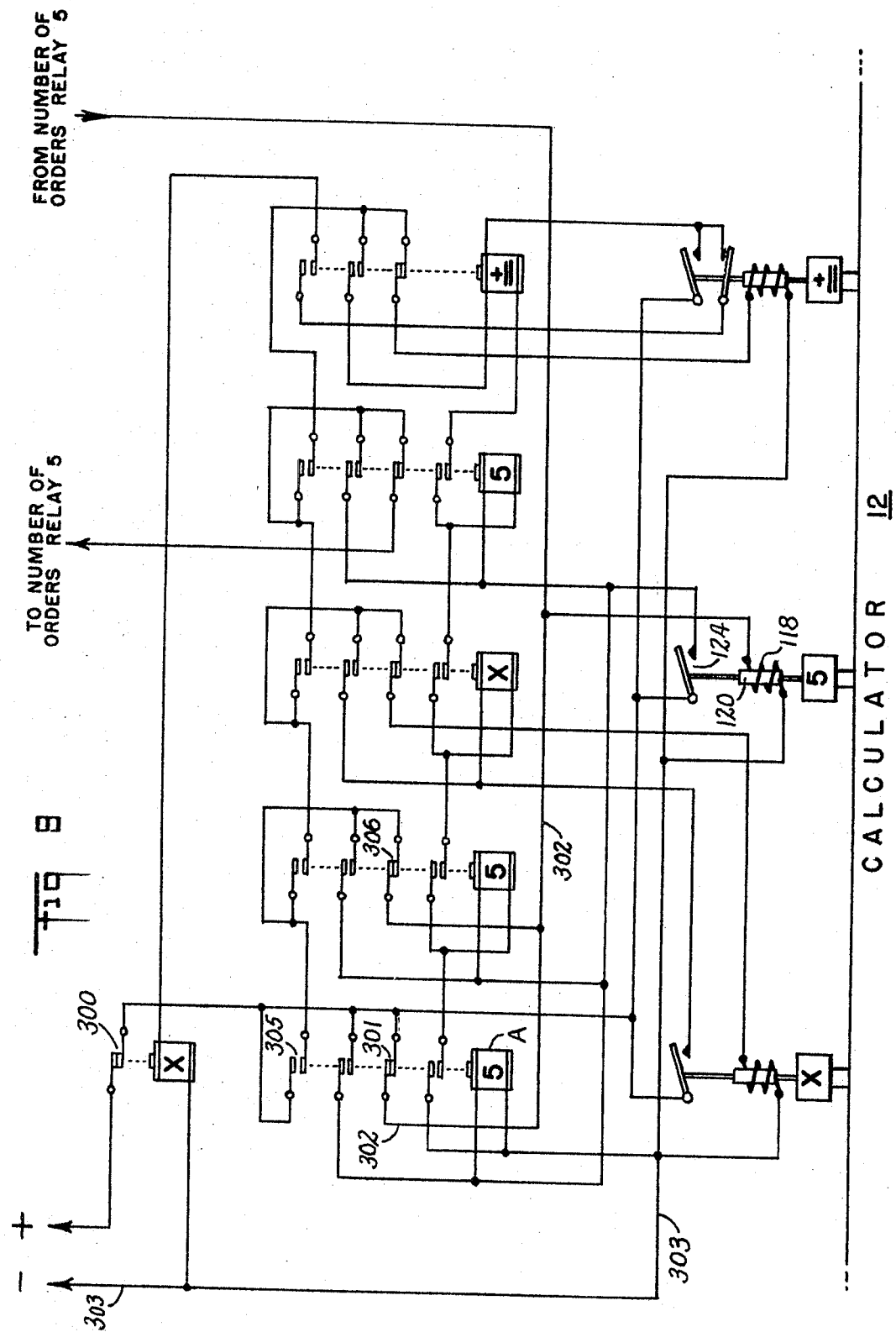

3,458,690
AUTOMATIC CALCULATING AND PRINTING SYSTEM WITH STORAGE COMPONENTS
See Fong Chan, 47—09 Newtown Road,
Astoria, N.Y. 11103
Continuation-in-part of application Ser. No. 350,475,
Mar. 9, 1964. This application May 26, 1966, Ser.
No. 553,256
Int. Cl. G06m 3/06
U.S. Cl. 235—146                    11 Claims

ABSTRACT OF THE DISCLOSURE

A printing and calculating system incorporating a printing mechanism operated by a keyboard which also operates the keyboard of a standard calculator by electrical means. The electrical means includes groups of price relays as memory units storing preselected prices of food items. The first mentioned keyboard operates item for sale relays in control of the price relay groups. Said keyboard also provides number of order keys which control circuits including the price relays so that the stored prices can be multiplied on the calculator according to the number of orders of the item. The system also provides means for causing the calculator to substract according to the number of orders providing the price totals are to be modified for lunch and à la carté prices.

---

This application is a continuation-in-part of application Ser. No. 350,475, filed Mar. 9, 1964, now abandoned. The invention relates to a printing register associated with a keyboard and a calculator. The invention has particular reference to a printing register which contains keys designating items numbers and commodities rather than prices, the prices of the commodities being stored and relayed on depression of the appropriate key to the calculator which prints out the total price depending on the number of items of the commodity sold.

The usual cash register employed by restaurants and other places of business requires the entering of a price for each item sold. This requires a knowledge of all the prices listed. If a number of similar items are sold, the operator must multiply the number by the price before entering the amount onto the bill. When a large number of items are available for sale the operator must either look up the price or must memorize the entire catalog or menu or else memorize all the prices. The present invention avoids these difficulties by including the price of each item in a relay circuit and by designating the name of the item on each key instead of the price. Also a calculator is coupled to the keyboard and arranged for automatic multiplication of the item price when more than one item is sold. The use of this printing register avoids mistakes and produces a bill with each item printed thereon and a total price without any mental arithmetic processes.

One of the objects of this invention is to provide an improved printing register which avoids one or more of the disadvantages and limitations of comparable and known registers.

One advantage of the invention is to increase the speed of billing restaurant orders.

Another advantage of the invention is to eliminate the need of memorizing a large number of prices.

Another advantage of the invention is to provide accurate billing results for all customers.

Another advantage of the invention is to produce a printed bill which can be read easily.

The invention includes a keyboard containing a plurality of keys each provided with a name which identifies a food item. The keyboard also contains control keys which represent the number of orders, clearing and printing. The keyboard controls a number of relays and control circuits which operate solenoids coupled to a calculator. The calculator is arranged to multiply the price of the items by the number of orders and to add the total amounts for printing the total amount on the bill. The calculator is also arranged to make certain deductions in the price by substracting fixed amounts from the total depending on whether the items are ordered from the lunch or dinner menus or à la carté.

For a better understanding of the present invention, together with other and further objects thereof, reference is made to the following description taken in connection with the accompanying drawings.

FIG. 1 is a schematic view of all the components of the printing and calculating apparatus showing parts of the circuit in block form and a restaurant check printed on by the apparatus showing number and name of orders and totals at lunch, dinner and à la carté prices, by way of example.

FIG. 2 is a plan view of the calculator keyboard used with the register.

FIG. 3 shows the mathematical equations used to calculate the prices of the commodities sold and the corresponding register keys used to operate the relays and in turn the calculator.

FIG. 4 is a plan view of the keyboard of the register showing one arrangement of the meat and vegetable keys.

FIG. 5 is a functional box diagram of the system required to operate the calculator.

FIGS. 6 and 7 show a schematic diagram of connections of a portion of the control circuit. These figures will be used to illustrate the operation of the device.

FIG. 8 is a view taken from Patent No. 2,361,260 showing the main components of the print register.

FIG. 9 is a schematic diagram showing a price relay negative control circuit.

Referring now to FIG. 1, the printing register includes a keyboard 10 (shown in detail in FIG. 4) and a plurality of recorder relays 25, each of which is controlled by one or more clear relays 61 to normalize them after an operation. Relays 25 are coupled to a series of price relays 27, shown in detail in the complete circuit of FIGS. 6 and 7. The price relays contain only the prices of the items and when more than one order is received for any one item, a multiplying circuit 28 is employed to control the transmission of the price to the calculator circuit 12. The calculator circuit operates a printing mechanism 14 which is used to print the total price on a restaurant check 30 after the line printer operated by the keyboard 10 has printed the number of food items and the food names. The price relays 27 are coupled to the number of order relays 28 and the combined circuits operate a set of calculator solenoids 13 to produce, by mathematical calculation, the total price of the items. The price is then printed on the right hand side of check 30 by the printing mechanism 14 controlled by the calculator. As soon as the total is printed, an impulse is sent to the "clear" circuit 61 which normalizes all the relays.

The keyboard 10 shown in FIG. 4 includes a plurality of meat keys 16, each designated with a name or abbreviation indicating the type of commodity sold. The keyboard also includes a number of vegetable keys 17 also labeled to indicate the name of the vegetable. At the left side of the keyboard is a plurality of keys 18 for indicating the number of orders of each item represented by keys 16 and 17. To the right of the vegetable keys are three control keys 20, 21 and 22 labeled "L," "D," "A," respectively. These keys represent lunch, dinner and a la carte and are for price reductions depending upon the time of day the orders are placed. The keyboard also contains a print key 23 for causing the entire mechanism to operate and a clear key 24 for clearing the control circuitry and the print register in case a mistake has been made.

The print register is shown in FIG. 8 which is a view taken substantially in its entirety from Buehler Patent No. 2,361,260. As shown, there is associated with the keys, for example, the keys 18 in the item number column, a set wheel 199. Where there is more than one digit or letter to be printed, there will be a plurality of set wheels for each key. Each set wheel is associated with a print wheel 189 which is positioned according to the setting of the set wheel which has an internal stop (not shown) to assure that its rotation in operation will correspond to the desired rotative positioning of its corresponding print wheel. The two wheels are turned together by means of actuator 188 under spring pressure. The driving connections between the spring loaded actuator and the wheels are as follows. Pinion 198 on the key stem engages gear 186 on depression of the key 18. Pinion 187 mounted on the same shaft as gear 186 engages rack 201 on the actuator 188 which has a second rack 201A and a rack engaging segmental gear 192 which drives the print wheel 189 through gears 194, 195 and 196.

Each of the key stems is provided with a camming surface 200 adapted to engage sidewardly projecting lugs formed on a locking slide 202 which is urged to its rearward position by tension spring 204 and is adapted to latch over a shoulder 206 formed on each of the key stems directly above its camming surface 200. Each of the keys has a return spring 208. A disengaging slide 210 is urged forwardly by the camming surface on the key stems to cause bail 212 to rotate counterclockwise against spring 214 and release the actuator for forward movement. A solenoid 216 is connected to a cross bar attached to all the slides 202 and when energized by depression of the clear button, as hereinafter explained, all of the depressed keys are simultaneously released.

There is secured to the bottom of each key stem a spring pressed element 218 which is adapted to engage a contact of a control relay switch 220 to close the switch, which is normally open, on depression of a print register key.

The print wheels are pivoted on shaft 222 and are caused to pivot on this shaft by solenoid 224 in control of crank arm 226 which is connected to the throw arms of all the print wheels. Actuation of the throw arms pivots the wheels against a ribbon 227 whereby production of the characters on the bill 30 is effected.

FIGS. 6 and 7 show composites of the wiring diagram for six orders of chicken chow mein. In this diagram there is one number key 18A for six orders. It is to be understood that there may be nine keys for nine orders (or nine plus nine for eighteen orders) to take care of multiple orders of this type. FIG. 4 also shows several meat keys 16. The key 16A is for chicken. This meat price for chicken is by way of example, $1.25. The vegetable key 17A for chow mein is one of several vegetable keys 17. This key and its associated circuit control the price of this vegetable item which is assumed to be priced at ninety cents. The two items combined make up an order of chicken chow mein. The dinner price of chicken chow mein is, therefore, $1.25+$.90 or $2.15.

The lunch key 20 is depressed when luncheon is being served and this key and circuit automatically reduces the standard calculated price by a predetermined amount. In this case the lunch prices of $1.25 and $.90 are reduced by $.50. The total computing formulation is shown in FIG. 3, first line. In a similar manner, the dinner key 21 control a circuit which does not alter the established price of the items, the dinner price being considered standard. A third key 22 for a la carte orders operates in a manner similar to the lunch key and reduces the price of the item by $.25.

When the print key 23 is depressed, a print relay winding 31 is actuated to close two pairs of contacts and orders the calculator to print the results either on a separate piece of paper or on restaurant check 30. In a similar manner, depression of either one of the keys 20, 21 or 22 causes the actuation of relays 32, 33 or 34 and closes contacts associated with these relays to activate computing circuits and solenoids to operate automatically the calculating machine.

The calculator machine employed in this printing register is a ten key computing mechanism manufactured by Victor Adding Machine Co., and sold under the trade name of "Comptograph." This type of machine is well-known in the industry and has been described and illustrated in many public articles and patents. Some United States patents describing calculators of this type bear the following numbers: 2,834,542, 3,024,975 and 3,030,010. As shown in FIG. 7, the keys of the calculator 12 are depressed and allowed to rise to normal state by solenoid operated plungers.

The entire circuit shown in FIGS. 6 and 7 is operated by a single source of potential 35 which in this case is a battery. When the item number key 18A is depressed, a number relay 36 is actuated and its contacts are held in operating position by a pair of locking contacts of a holding circuit. In a similar manner the depression of one of the meat keys such as 16A operates relay 37 and locks it into operating position. A vegetable key 17A controls a vegetable relay 38 in a similar manner.

For each meat item there is a collection of price relays; in this case the price is $1.25 and the price circuit is shown enclosed within the dotted lines 40 in FIG. 6. This circuit also includes a clear relay 41, a multiplier relay 42, and equal-positive relay 43. The operating power for this circuit is controlled by actuating the "M" relay 37 and by means of contacts 181 and 71. In a similar manner the vegetable relay 38 is coupled to a vegetable price circuit 44 also enclosed in dotted lines. This circuit includes a clear relay 45, a multiplier relay 46, and an equal-positive relay 47. The opearting power for this circuit is controlled by "VE" relay 38 and contacts 183 and 76. The connections between these relays and the contacts controlled by them will be described when the operation of the circiut is described.

The upper portion of FIG. 7 shows relays 50A and 51A which represent the price fifty cents which is to be subtracted from the dinner price of this item during the luncheon period. In order to compute the proper amount of an item, a number relay 52A is coupled to this circuit and then a multiplication relay 53A is actuated which multiplies $.50 by the number of orders and then subtracts the product from the first computed price by equal negative relay 52B. A total key 54A is used to add all the price values and print this sum on the strip of paper 30. The electrical power for this circuit is controlled by the "L" relay 32 by means of contacts 184 and 78. In a similar manner the a la carte relay 34 controls the price relays 55A and 56A representing 25 cents. When this value is multiplied by item number relay 57B and then subtracted from the dinner price of the item by equal negative relay 58B, the result is the correct amount for an a la carte order. Total relay 58A controls the circuit to operate the calculator and to print a total of the entire amount. The electrical power for this circuit is controlled by the "A" relay 34 by means of contacts 185 and 192.

The calculator 12 is supplied with a keyboard having keys shown in FIG. 2. There are ten digit keys and eleven operating keys whose control action is explained by the legend in the figure. The series of solenoids 13, FIG. 1, operate all these keys without manual control. Each solenoid includes a single winding and a movable core. One or more sets of contacts are secured to each solenoid and are operated whenever the solenoid is operated. The functions of these contracts will be described in detail when the operation is described.

During the operation of this register the operator depresses one of the numeral keys 18A which denotes the number of the orders, one of the meat keys 16A, then one of the vegetable keys 17A. If this order is received during dinner time, the operator depresses the "D" key 21 and then the print key 23 is depressed and the check 30 is immediately printed with the number of the orders, the names of the item ordered, the type of order, lunch, dinner or a la carte, and the price of the item. This action is automatic. If the operator makes a mistake, a correction can be made prior to depressing the print key 23 by depressing the clear key 24 and the entire circuit and keyboard of the print register are cleared and ready for the correction.

It should be noted that during this operation there is no need to insert any price figure into the register, the only figures being these that denote the number of items ordered.

In order to describe the operation of this device in detail, let it be assumed that six orders (chicken chow mein) are received for a meat (chicken) that costs $1.25, a vegetable (chow mein) that costs $.90 and that it is lunch time and each order should be reduced by $.50. The operation is as follows:

The operator first depresses the number 6 key 18A sending current from the source of potential 35 through the contacts 60 of the "clear" relay 61 to conductor 62 and one side of the key contacts 220 of key 18A. The current may then be traced to relay 36 conductor 80, and back to the negative side of the battery 35. This current actuates the relay and closes 64 and 65. Contacts 65 are locking contacts and complete a circuit from the positive terminal of the battery 35, through the clear relay contacts 60, through the locking contacts 65, relay 36, conductor 80 and back to the negative terminal of battery 35. Contacts 64 and 65 remain closed until the clear contacts 60 are opened. Contact 64 is in a circuit that is open at other points and no current flows through it at this time.

The operator next depresses the "M" or meat key 16A denoting the kind of meat order which in this case is chicken. The closing of the contacts 220 under the key 16A actuates relay 37, closing contacts 68, sends a current from battery 35, through contacts 60 of the clear relay 61, over conductor 66 to contacts 67 of the "M" clear relay 41, through locking contacts 68 of the "M" relay 37, through the winding 37, conductor 80, and back to the negative battery terminal. This circuit retains the relay in its operated condition until one of the "clear" contacts 60 or 67 are opened. When the "M" relay is operated, contacts 70 and 180 are opened and contacts 68, 71 and 181 are closed.

The operator next depresses the vegetable key 17A to record the vegetable ordered, which in this case is chow mein. This key closes contacts 220 under the key shaft and sends current from the battery 35 through contacts 60, over conductor 62 to the key contacts, through the relay winding 38, conductor 80 and back to the negative terminal of the battery. This current actuates relay 38 and closes contacts 72 which lock the relay in its operated condition. The locking circuit may be traced from the positive battery terminal through "clear" contacts 60, over conductors 62 and 73, through the normally closed contacts 74 of the "VE" clear relay 45, then through the closed contacts 72 of relay 38, the relay winding 38, conductor 80 and back to the negative battery terminal. The operation of this relay opens normally closed contacts 75 and 182 and closes contacts 72, 76 and 183. The actuation of these contacts 75, 76, 182 and 183 causes no further action at this time.

The opeartor next depresses one of the keys 20, 21 or 22, denoting Lunch, Dinner, or A la carte. Let it be assumed that it is lunch time and the "L" key 20 is depressed, this action sends current from the positive terminal of battery 35, through "clear" contacts 60, conductor 62 to the contacts 220 under key 20, then through winding 32 of the lunch relay, to conductor 80, and back to the negative battery terminal. This circuit locks the relay in its actuated condition because of locking contacts 77 which are bridged across the operating contacts under key 20. The actuation of this relay also closes contacts 78 and 184 but no current flows through these contacts at this time.

If, after depressing the keys described above, the operator discovers he has made a mistake, the circuit can be normalized by simply depressing the "clear" key 24. This closes the contacts under the key and sends current through winding 61 to open the normally closed contacts 60. When these contacts are open all the other relays have their holding circuits broken because they were all connected through contacts 60. Also, normally open contacts 250 are closed and solenoid 216 (FIG. 8) is energized and slide 202 is shifted to raise all the keys of the print register. After clearing the circuit and the keyboard, the operator can start again to enter the order.

If there has been no error, the operator can print the results by depressing the "Print" key 23. The operation of this key sends current from the battery 35, through contacts 60, over conductor 62, through the contacts 220 below the "Print" key 23, then through the winding 31 of the print relay and back over conductor 80, to the negative terminal of the battery. This current closes contacts 81 and 82 on the "Print" relay. Contacts 81 are bridged across the contacts under the "Print" key and hence act to lock the relay in its actuated position. At the same time solenoid 224 is energized. The circuit which causes this action may be traced from the positive terminal of battery 35, through contacts 60, over conductor 62, contacts 81, through printer solenoid winding 36A and negative battery terminal line 80. Actuations of this solenoid causes line printer 29 (FIG. 1) to print out the number of orders, the abbreviation of food items, and the lunch, dinner or a la carte designation on the restaurant check 30. Also by closing contacts 82 power is supplied to the entire system.

When contacts 82 are closed in operating power from the positive terminal of the battery is supplied through contacts 60, conductor 62, contacts 82, conductor 83, contacts 71, the lower contacts 86 on the "M" clear relay, through the normally closed contacts 87 of the "1" relay 89 in relay assembly 40, over conductor 88, to solenoid winding 90 (FIG. 7) and thence to negative conductors 91 and 80, to the negative terminal of the battery. This current operates the solenoid plunger 93 and depresses the "1" key 94 in the calculator keyboard 12. When the solenoid is operated, a pair of normally open contacts 95 are closed for a short time and another circuit is completed which actuates the "1" relay 89 in assembly 40. This circuit may be traced from the negative terminal of the battery, over conductor 80, through contacts 181 of the "M" relay 37, then over conductors 191 and 190, through the winding of relay 89, over conductor 96, through closed contacts 95, over conductor 97, through the "clear" contacts 86 of relay 41, through contacts 71, conductor 83, contacts 82, conductor 62, and the "clear" contacts 60, to the positive terminal of the battery. This circuit actuates relay 89, opening contacts 87 and closing contacts 100 and 101. When contacts 87 open the solenoid circuit is broken and then solenoid 93 is returned to its normal state. However, key 94 has been depressed and a "one" has been recorded in the calculator mechanism indicated partially in FIG. 7.

Contacts 100 on the "1" relay 89 act as holding contacts since they are connected to one side of the relay winding and the operating circuit described above. Contacts 101 connect closed contacts 102 on the "2" relay 103 to an operating circuit which sends current through a "2" solenoid above the "2" key 99 in the calculator. This circuit can be traced from the negative conductor 91 in FIG. 7, through the solenoid winding 104, operating its core 105, thence over conductor 106, through contacts 102 and 101, through contacts 86 and 71, thence over conductor 83 to contacts 82, conductor 62, contacts 60 and the positive terminal of the battery. When the solenoid core 105 is depressed a normally open pair of contacts 111 is closed for a short time. This action completes another circuit which actuates the "2" relay 103 in circuit 40 in FIG. 6. This circuit may be traced from the negative terminal to conductor 80, through contacts 181 of "M" relay 37, over conductors 191 and 190, through winding 103 of the "2" relay, over conductor 112, to closed contacts 111, conductor 97, contacts 86, 71, conductor 83 and contacts 82, over conductor 62, contacts 60 to the positive terminal of battery 35.

When the "2" relay 103 is operated, it locks into its operated condition because of a locking circuit completed by contacts 113, similar to contacts 100 on the "1" relay. Operation of the "2" relay opens contacts 102 which open the operating circuit to the solenoid winding 104 and solenoid plunger 105 returns to its normal position. This action opens contacts 111. When contacts 114 on the "2" relay are closed, a circuit is completed which sends current through the "5" solenoid winding 118 to operate the solenoid core 120 and depress the "5" key 121 on the calculator keyboard 12 (FIG. 7). This circuit can be traced from the negative conductor 91, through solenoid winding 118, conductor 117, contacts 116, 114, and 101, contacts 86, 71, and 82, conductor 62, contacts 60, and back to the positive side of the battery 35.

As soon as the "5" solenoid core 20 is operated, and its normal open contacts 124 are closed, a circuit is completed which actuates relay 122 which is the "5" relay in FIG. 6. This circuit can be traced from the negative terminal of the battery to conductor 80, through the contacts 181 of "M" relay 37, over conductors 191 and 190, through winding 122 of the "5" relay, then over conductor 123, through the now closed contacts 124 on the solenoid plunger 120, then back over conductor 97 which leads to the positive terminal of the battery through contacts 86, 71, 82 and 60, as described previously. When the "5" relay 122 is actuated, the normally closed contacts 116 are opened. These contacts are in series with the operating circuit of the "5" solenoid 120, hence the solenoid is returned to normal as soon as the relay is actuated.

After the "5" relay 122 is operated, the closed contacts 131 keep the relay 122 in locking position like the contacts 113 in relation to "2" relay 103. The current flows through contacts 128 to contacts 126 of relay 42 and conductor 142 to operate solenoid plunger 138 for depressing the multiplier key 140 on the calculator.

When the plunger 138 of the multiply solenoid is actuated, contacts 147 are closed. This actuates the multiply relay 42 by a circuit similar to the relay circuits described above and includes conductor leading from the negative terminal of the battery 35, winding 42, conductor 148, closed contacts 147, and conductor 97 which leads to the positive side of the battery through two "clear" contacts.

Relay 42 is now actuated and is held in its actuated position by means of a pair of holding contacts 137. The actuation of this relay opens contacts 126 which are in series with the circuit which operated solenoid plunger 138. When these contacts open, the plunger is again normalized and contacts 147 are opened.

With relay 42 in its actuated condition and contact 144 closed, a circuit is completed which operates solenoid plunger 136 to depress the "6" key 132 on the calculator. The circuit for this action can be traced from negative conductors 80 and 91 through solenoid winding 125, over conductor 107, through closed contacts 64 on relays 36, conductor 115 and 146, closed contacts 143, 144, 128, 114, 101, 86, 71, conductor 83, contacts 82 conductor 62 contacts 60 to the positive terminal of the battery.

After the "6" solenoid core 136 depresses key 132 and, at the same time, closes contacts 134, this action completes a circuit which causes the actuation of the "6" relay 127. The circuit is similar to the relay operating circuit described above and includes the "6" winding 127, conductor 135, closed contacts 134, and conductor 97 which leads to the positive side of the battery in series with two "clear" contacts.

When the "6" relay 127 is actuated contacts 143 are opened and the operating circuit to the "6" solenoid is broken the solenoid core 136 is returned to its normal position and contacts 134 are opened. Now, with relay 127 in its actuated condition and contacts 150 and 162 closed, a circuit is completed which operates the equal positive plunger 151 and key 152.

The circuit which operates plunger 151 leads from positive terminal of the battery 35 to contacts 60, 82, 71, 86, 101, 114, 128, 144, 162 and 153 on relay 43, conductor 154, winding 155, and the negative conductor 91, conductor 80 to the negative terminal of the battery. When this plunger is operated, contacts 156 are opened and contacts 157 are closed.

When contacts 157 are closed, a circuit is completed which actuates the equal positive relay 43. This circuit is similar to the above described relay operating circuits and includes contacts 157, conductor 158, and the relay winding 43. As soon as this relay is actuated, contacts 153 are opened and contacts 160 and 161 are closed. The opening of contacts 153 opens the circuit to winding 155 and the plunger 151 returns to normal, closing contacts 156 and opening contacts 157. This action sends current to operate "M" clear relay 41 which may be traced from the positive terminal of battery 35, contacts 60, conductor 62 and contacts 82, conductor 83, contacts 71, contacts 86 and 101, contacts 114, contacts 128, contacts 144, contacts 162 and 160, conductor 158, contacts 156, conductor 164, contacts 161 on relay 43, and over conductor 165, to the winding 41 of the "M" clear relay. This circuit continues over conductor 191, contacts 181 of the "M" relay 37, to conductor 80 and the negative terminal of the battery.

Equal positive key 152 is depressed to multiply (1.25×6), no current flowing through clear relay 41 until the multiplier action is completed. This delay is due to the closed contacts 156 on solenoid 151.

The above described circuit operates the clear relay 41 and opens contacts 86 and 67, thereby disabling the meat price circuit 40 and all the holding or locking circuits in this part of the device. Opening the contacts 67 disables the meat relay 37, and normalizes the holding or locking circuit of "M" relay 37.

The vegetable key 17A having been previously depressed and the selected meat relay circuits having concluded their functioning, the recorder relay 38 is in its operating state. The vegetable price circuit is enclosed within dotted lines 44 and is substantially the same as the meat price circuit except that the price is $.90. The multiplying relay 46 and the equal positive relay 47 are connected in the same manner as in the meat circuit 40. The current which operates the vegetable price circuit 44 is applied after the "M" relay 37 is normalized. The operating circuit can be traced from the positive terminal of battery 35, through contacts 60, over conductor 62, to closed contacts 82 on relay 31, then over conductor 83 to contacts 70 on the "M" relay 37. The circuit continues through contacts 76 on the actuated "VE" relay 38, to contacts 48 on the "VE" clear relay 45 and to circuit 44. The negative portion of this circuit is controlled by relay 38 and this circuit can be traced from the negative terminal of the battery over conductor 80 to contacts 180 on the "M" relay 37, then through contacts 183 on the "VE" relay 38, over conductor 53 to circuit 44.

The operation of the circuit 44 which controls the price is quite similar to the meat price circuit 40. At this time the price of the items have been calculated by the calculator part of the device as (1.25×6)+(.90×6). The "VE" clear relay 45 is now actuated and contacts 48 and 74 are opened. The contact 48 disables all the locking circuits in block 44 and all relays are normalized. The contact 74 disables the "VE" relay 38, and normalizes the holding or locking circuit of relay 38.

The circuit uses two key plunger solenoids 151 and 151A, of which one is for the meat price circuit and the other for the vegetable price circuit to operate the same equal positive key 152. This prevents the meat price equal positive being energized without normalizing the vegetable price circuit or vegetable recorder relay.

Next, the lunch reduction circuit is put into operation and the price ($.50) times the number of orders is computed. After "VE" relay 38 is normalized, the current flow into lunch reduction circuit 57 (FIG. 7) can be traced from positive terminal of battery 35 to contact 60, conductor 62, contact 82, conductor 83, contact 75, to actuated "L" relay 32, contact 78, conductor 56, to circuit 57. This time, instead of multiplying the orders by the reduction price and adding the result equal negative key is depressed on the calculator. The calculator multiplies the amounts and subtracts the product from the amount in the accumulator.

$$(1.25 \times 6) + (.90 \times 6) - (.50 \times 6)$$

If the above order were received at dinner time, the "D" key 21 would be depressed by the operator and there would be no reduction of the price. The circuit which energizes the total key in this operation can be traced from the positive terminal of the battery 35, through contacts 60, conductor 62, contacts 82 on the print relay 31, over conductor 83, to contacts 75 on the "VE" relay 38, then through contacts 187 on the "D" relay 33, over conductor 199 to winding 200 (FIG. 7) of the solenoid which operates the total key 168. From the solenoid winding the circuit continues over conductor 91 and 80 to the negative terminal of the battery.

If the order is an a la carte order, the operator depresses the "A" key 22 and actuates relay 34, closing contacts 192, 185 and 252. The operation of this circuit is the same as the lunch price circuit except that relays 55A and 56A are used to produce a reduction of 25 cents for each order.

The final operation is the depression of the total key 168. This is accomplished by the usual control circuitry described above in detail.

At the end of the total taking operation the "clear" relay 61 is energized so as to open contacts 60 and restore all relays and solenoids to their normal condition. This is accomplished by a circuit which may be traced from the negative terminal of the battery 35 through the relay winding 61 and over conductor 169 to the total relay 54A (FIG. 7). The circuit continues through contacts 170, conductor 171 to the contacts 172 secured to the plunger 173 which operates the total key 168 on the calculator, continues over conductor 203, closed contacts 204, contact 205, conductor 206 to contact 207 in solenoid 208, conductor 209, contact 210 to contacts 211, contacts 212 in actuator relay 53A, contacts 213 in actuator relay 51A, contacts 214 of actuator 50A, conductor 56, to contacts 78 on actuated "L" relay 32, contact 75, to conductor 83, contact 82, conductor 62, contact 60, and to positive terminal of the battery 35. It will be obvious that the clearing action occurs at the instant the total key 168 is normalized after the total taking operation.

It should be noted that the "equal positive," "equal negative" and "total" keys in the calculator 12 are depressed in a sequential manner, each being depressed after its associated relay is operated. It should also be noted that the next sequential plunger cannot be operated unless the prior plunger has been returned to its normal state.

During all the operations described above, the non-print key 177 and accumulate key 188 are retained in their depressed position until a total figure is to be printed from the calculator. This eliminates the printing of a lot of unnecessary figures. Figures are printed by the calculator device only when the total key plunger solenoid 200 is energized and the normally closed contacts 173A are opened. This action releases solenoid plunger 75 and non-print key 177 and releases solenoid plunger 178 and accumulate key 188 and causes the total key 168 to print the total of the entire transaction. This printing action is performed by print type on the calculating mechanism. The circuit which controls this action can be traced from the negative conductor 91, through solenoid winding 176 and 179, then over conductor 174, through contacts 173A, over conductors 162, 73 and 62 (FIG. 6) to contacts 60 and the positive terminal of the battery.

Referring to FIG. 5, it may be seen that each meat dish circuit is adapted to be connected to each of the vegetable dish circuits depending on which keys corresponding to these dishes are depressed. In turn, each of the vegetable dish circuits are connectable to the lunch, dinner and a la carte circuits depending on which of the latter is selected. The obvious reason for this inter-relationship is the requirement that the meat, vegetable and L, D, and A circuits operate sequentially whether the keys of the print register are depressed simultaneously or in some order. When one of the circuits is operating, the others are held inoperable by the operating circuit until the latter has completed its selected function. The succeeding circuit which has been selected will then begin to function at that time. It may also be seen that each of the meat, vegetable and L and A circuits includes price relay circuits connectable to each of the number of order relays. The price relay circuits and the number of order relays are connected directly to solenoids which operate the calculator.

In FIG. 6 and FIG. 7, all price relays are connected to a common negative line to operate the circuit which is permitted because the same number does not successively repeat itself in the mathematical equation. Where the price relay box is employed to multiply numbers having repeating digits, the circuitry is slightly modified.

FIG. 9 shows a price relay negative control circuit. This circuit can compute any mathematical equation with the same numbers repeating, such as $55 \times 5 =$. This circuit and the operation thereof are quite similar to the meat price circuit 40 and its operation except each price relay has an additional pair of normally open contacts which control the negative current to operate the price relays separately.

The current from the positive terminal first goes to contact 300 in clear relay "x," then to contact 301 in relay "A," conductor 302, over solenoid winding 118 and thence to negative conductor 303 to the negative terminal. This current operates the solenoid plunger 120 and depresses the "5" key in the calculator 12. When the solenoid is operated, a pair of normally open contacts 124 is closed which actuates the first "5" relay "A." Because the first "5" relay "A" is the only one directly connected to the negative line, the solenoid 120 does not function a second time until the first "5" relay "A" is operated to raise the plunger of solenoid 120 and then to depress the plunger a second time by causing current to pass through the closed contacts 305 and the normally closed contacts 306 which are directly connected to the winding of solenoid 120.

If the manager of the restaurant wishes to change the prices of the items for any reason, it is only necessary to change the connections to the lunch price relays in block 57 or the connections to the a la carte price relays in block 58.

From the above description and operation it is evident that a novel type of control circuit has been developed which can be used to operate a conventional ten key calculator, depressing the operating keys in a sequential manner and printing the total in the usual manner on a strip of paper.

The foregoing disclosure and drawings are merely illustrative of the principles of this invention and are not to be interpreted in a limiting sense. The only limitations are to be determined from the scope of the appended claims.

What is claimed is:

1. In a printing and calculating device, a printing mechanism, a keyboard for mechanically operating said mechanism (a calculator having means for multiplying and adding and including a second keyboard and a second printing mechanism operated by said second keyboard, and an electrical circuit having price relays selectively and sequentially energized by said keyboard, said price relays being in control of the keyboard of said calculator, said price relays being arranged in groups, each group representing the price of an item offered for sale.

2. In a device as defined in claim 1 wherein said circuit includes number of order relays also in control of the keyboard of said calculator.

3. In a device as defined in claim 2 wherein said circuit operated by said keyboard includes item for sale relay circuits, each of said item for sale relay circuits being connected to one group of price relays.

4. In a device as defined in claim 3 wherein said item for sale relay circuits are arranged in groups with one group having switch contacts connected into another group for holding the relays in said other groups inoperative while the relays in said one group are energized.

5. In a device as defined in claim 4 wherein separate pairs of switch contacts are controlled by each price relay and there is provided a pair of solenoids for operating the print mechanism of said calculator, solenoid de-energizing contacts controlled by each of said solenoids, one pair of said switch contacts being normally open and connected to one of the solenoids, the deenergizing contacts of one of said solenoids being connected to a price relay, the other of said solenoids being connected to said relay, the other of said solenoids being connected to another pair of said switch contacts which are normally closed whereby said other solenoid is deenergized when said relay is energized.

6. In a device as defined in claim 4 wherein there is provided a power source and a clear relay circuit having a pair of normally closed switch contacts connected to said source, each of said item for sale relay circuits and said number of order relays are connected to the normally closed switch contacts of said clear relay.

7. In a device as defined in claim 6 wherein each of said price relays are connected to each of said number of order relays.

8. In a device as defined in claim 7 wherein said keyboard includes a print key and there is provided a solenoid in control of said printing mechanism and a switch operated by said print key and connected to the last mentioned solenoid and to each of said item for sale relay circuits.

9. In a device as defined in claim 8 wherein said calculator is adapted to print totals without printing subtotals beforehand.

10. In a device as defined in claim 3 wherein said keyboard is provided with a number of orders keys and said electrical circuit includes a separate set of relays controlled by said number of orders keys to set in a multiplier quantity in said calculator whereby the item for sale price set into the calculator by said price relays can be multiplied by the selected number of orders.

11. In a device as defined in claim 10 wherein said circuit includes an additional group of price relays and said keyboard includes total price modifying keys in control of said additional group of price relays whereby said number of order keys and siad price modifying keys can be used to set in total price modification quantities in said calculator.

References Cited

UNITED STATES PATENTS

| 2,361,260 | 10/1944 | Buehler | 101—96 |
| 2,567,241 | 9/1951 | Skillman et al. | 235—61 |
| 2,646,217 | 7/1953 | Law | 235—61 |
| 3,146,941 | 9/1964 | Heise | 235—60 |
| 3,156,412 | 10/1964 | Julius et al. | 235—146 |
| 3,203,627 | 8/1965 | Nixon et al. | 235—146 |
| 3,227,367 | 1/1966 | Coja | 235—146 |
| 3,294,960 | 12/1966 | Townsend | 235—160 |

STEPHEN J. TOMSKY, Primary Examiner

U.S. Cl. X.R.

235—2, 91